United States Patent [19]

Yuasa et al.

[11] Patent Number: 5,183,879
[45] Date of Patent: Feb. 2, 1993

[54] POLYMER GEL MANUFACTURING METHODS

[75] Inventors: Satoshi Yuasa, Yokohama; Yoshinori Tomida, Ebina, both of Japan

[73] Assignee: Canon Kabushiki Kaisha, Tokyo, Japan

[21] Appl. No.: 423,893

[22] Filed: Oct. 19, 1989

[30] Foreign Application Priority Data

Oct. 21, 1988 [JP] Japan .................................. 63-264027
Oct. 28, 1988 [JP] Japan .................................. 63-270886
Feb. 17, 1989 [JP] Japan .................................... 1-36320

[51] Int. Cl.$^5$ .............................................. C08F 6/04
[52] U.S. Cl. .................................... 528/503; 528/499; 521/82; 521/142; 521/149; 524/555; 524/556; 526/909; 526/930
[58] Field of Search ................. 528/496, 503, 499; 526/303.1, 306, 930, 909, 317.1, 329.7; 524/916, 849, 850, 853, 854, 555, 556; 521/82, 141, 142, 143

[56] References Cited

U.S. PATENT DOCUMENTS

| 2,953,546 | 9/1960 | Thomas et al. | 526/307.2 X |
| 3,720,534 | 3/1973 | Macaulay et al. | 524/776 X |
| 4,059,552 | 11/1977 | Zweigle et al. | 524/910 X |
| 4,981,625 | 1/1991 | Rhim et al. | 526/909 X |

FOREIGN PATENT DOCUMENTS 0037138 10/1981 European Pat. Off. .
0122797 10/1984 European Pat. Off. .
0215413 12/1983 Japan .................................. 526/307.2

*Primary Examiner*—Fred Teskin
*Attorney, Agent, or Firm*—Fitzpatrick, Cella, Harper & Scinto

[57] ABSTRACT

Disclosed are a polymer gel in which a phase transition occurs due to a stimulus, a method of manufacturing such a polymer gel, and an actuator which employs such a polymer gel. The polymer gel which is formed by polymerizing monomers at a temperature equal to or less than a phase transition temperature of the resultant polymer gel and separating and/or classifying the polymer gel into fractions according to its size at a temperature equal to or greater than the phase transition temperature thereof. Alternatively, the polymer gel is separated and/or classified into fractions by adding a low molecular weight compound that can dissolve and swell the polymer gel to separate the polymer gel into fractions based upon a difference in dissolving rate or swelling rate. Alternatively separation and/or classification of the polymer gel is performed by a combination of the above-described two methods. In consequence, the resultant polymer gel has an average particle size ranging from 0.1 μm to 100 μm, and exhibits standard deviation of within 25 % of the average particle size. The width of the phase transistion peak of the resultant polymer gel as measured by DSC at a heating rate of 1 °C./min is within 10 °C.

43 Claims, 1 Drawing Sheet

POLYMER GEL MANUFACTURING METHODS

BACKGROUND OF THE INVENTION

1. Field of the Invention

The present invention relates to a polymer gel capable of a phase transition occurring due to a stimulus, such as heat, light or an electric field, a method of manufacturing such a polymer gel, and an actuator which employs such a polymer gel.

2. Related Background Art

Recently, attention has been paid to the phenomenon of polymer gels which experience a change in their volume upon being subjected to various types of stimuli. Polymer gels exhibiting this phenomenon include polyacrylamide and polyvinyl alcohol.

Conventionally, such polymer gels are formed in a bar-like or string-like bulky shape. This is advantageous because manufacture is easily facilitated and because the resulting products are visually recognizable. However, since the phase transition occurs causing a change in the volume due to a diffusion of water contained in the system, formation of a polymer gel in a bulky shape is not desirable because it hinders the sensitivity of the polymer gel's phase transition and decreases the speed thereof.

Spherically shaped polymer gels are also known, such polymer gels being described on pages 301 to 305 in "High Polymer, Japan" by Mori, Vol. 13, No. 145 and on pages 40 to 47 in "Journal of the Japan Society of Mechanical Engineers" by Tatara, Vol. 76, No. 656. However, these polymer gels exhibit non-uniform particle size and composition.

It is apparent that particulate polymer gels having a large surface area are desirable from the viewpoint of the smoothness with which a substance diffuses from the polymer gel to result in a change in the volume thereof.

In the case of a nonaqueous monomer such as styrene, pearl polymerization is generally employed to form a particulate polymer. When a water-soluble monomer is polymerized to form a particulate polymer, the monomer is emulsified in a nonaqueous medium to form reversed phase micelles. However, polymerization of the water-soluble monomer has difficulties, for example, in the selection of a surface active agent which is used to form the reversed phase micelles.

In particular, polymerization of acrylamides or the like, the polymer of which exhibits a change in volume requires crosslinkage of the polymer by a low molecular weight crosslinking agent, thus necessitating the requirement that the particles have a uniform composition. A non-uniform composition of the polymer leads to non-uniform changes in the volume thereof, which causes degradation in the sharpness of the phase transition and reduction in the response speed.

Needless to say, when such a polymer gel is used to form, for example, an actuator, the resultant actuator will not respond quickly to a stimulus and hence will not ensure precise operation.

A particulate polymer gel may also be obtained by pulverizing the polymer gel obtained by solid phase polymerization. However, the particles obtained by pulverizing the solid phase polymerized crystals or bulk polymer gels are non-uniform in their composition and size, and this makes it impossible for an actuator made of such a particulate polymer gel to operate quickly and precisely.

For the above-described reasons, such an actuator made of this polymer gel is slower in responding to a stimulus, has a low torque, and is not efficient when compared with a mechanical actuator.

SUMMARY OF THE INVENTION

An object of the present invention is to provide a particulate polymer gel whose composition and size are uniform, and an actuator which is made of such a polymer gel so as to avoid the above-described problems.

To this end, the present invention provides a method of manufacturing a polymer gel which comprises the steps of preparing a polymer gel by polymerizing monomers from which the polymer gel is formed at a temperature equal to or less than a phase transition temperature of the resultant polymer gel, and separating and/or classifying the resultant polymer gel into fractions at a temperature equal to or greater than the phase transition temperature thereof.

The present invention also provides a method of manufacturing a polymer gel which comprises the steps of preparing a polymer gel by polymerizing monomers from which the polymer gel is formed, and separating and/or classifying the resultant polymer gel by the addition of a low molecular weight compound which dissolves and swells the polymer gel.

The present invention also provides a method of manufacturing a polymer gel which comprises the steps of preparing a polymer gel by polymerizing monomers from which the polymer gel is formed at a temperature equal to or less than a phase transition temperature of the resultant polymer gel, separating and/or classifying the resultant polymer gel into fractions at a temperature equal to or greater than the phase transition temperature thereof, and further separating/classifying the polymer gel by the addition of a low molecular weight compound which dissolves and swells the polymer gel.

The present invention also provides a method of manufacturing a polymer gel which comprises the steps of preparing a solution by dispersing monomers or a monomer solution from which the polymer is formed in a dispersion medium, and polymerizing the solution at a temperature equal to or less than the solidification point of the monomer or of the monomer solution.

The present invention also provides a polymer gel whose average particle size ranges from 0.1 μm to 100 μm and which is characterized in that the standard deviation in the particle size distribution is at most 25% of the average particle size, more preferably, at most 20% of the average particle size. Alternatively, the present invention provides a polymer gel which is characterized in that the width of the phase transition temperature measured by DSC at a heating rate of 1° C. per minute is within 10° C. Furthermore, the present invention provides a gel actuator which employs any of these polymer gels.

DETAILED DESCRIPTION OF THE PREFERRED EMBODIMENTS

Figure 1:
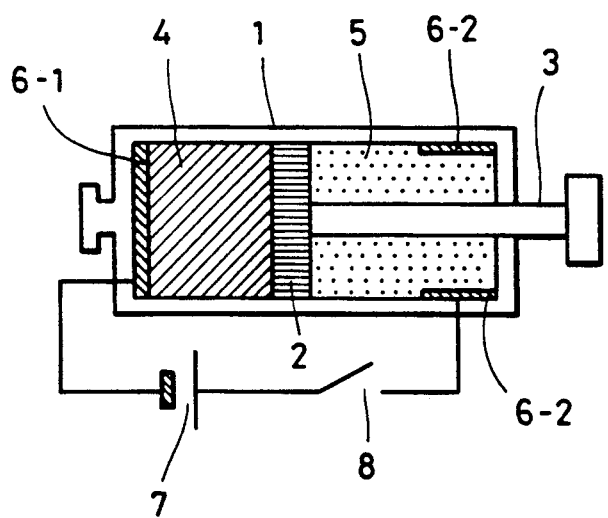
FIG. 1 illustrates an example of an actuator according to the present invention.

According to one aspect of the invention, there is provided a novel method of manufacture of a polymer gel by polymerizing monomers from which the polymer gel can be formed at a temperature equal to or less than a phase transition temperature of the resultant polymer gel and separating the resulting polymer gel into fractional portions thereof at a temperature equal to or greater than the phase transition temperature of said polymer gel.

In one embodiment of the method of manufacturing a polymer gel having a phase transition temperature, monomers are suspension polymerized at a temperature equal to or less than the phase transition temperature of a resultant polymer gel while dispersed in a dispersion medium to obtain a polymer gel in a swelled state.

Step (1) When the particles of the resultant polymer gel which are in a disperse phase are to be separated from the dispersing medium and a surface active agent, or are to be classified into fractions according to size or composition, the temperature of the polymer gel is maintained at a value equal to or greater than the phase transition temperature thereof in order to shrink the particles.

According to another aspect of the present invention, there is provided a novel method of manufacturing a polymer gel by polymerizing monomers from which the polymer gel is formed and separating the resultant polymer gel by adding a low molecular weight compound that can dissolve or swell the polymer gel and separating the polymer gel into fractional portions thereof based on a difference in swelling or dissolving rate or degree of swelling.

In one embodiment of the second method of manufacturing a polymer gel, a monomer is suspension polymerized at a temperature equal to or higher than the phase transition of the resultant polymer gel while dispersed in a dispersion medium to obtain a polymer gel in the shrunken state, in which the polymer gel is separated from the dispersing medium and a surface active agent.

Step (2) When the particles of the polymer gel which are in a disperse phase are to be classified according to size or composition, a low molecular weight compound which is a good solvent of the polymer gel is used in order to separate the polymer gel to classify the polymer gel due to a difference in the swelling rate.

In another method of manufacturing a polymer gel, a polymer gel in the shrunken state on which separation or classification of the polymer gel has been performed to some extent is first prepared by the process described in Step (1), and the operation of Step (2) is then conducted on the shrunken form of the polymer gel so as to obtain a polymer gel having uniform particle size and composition.

The method of Item 2 may also be applied to the manufacture of a polymer gel whose phase transition temperature is not in the vicinity of room temperature. In this application, a monomer is suspension polymerized to obtain a polymer gel in a shrunken state. A low molecular weight compound which is a good solvent of the polymer gel is then applied to the resultant shrunken polymer gel to separate the polymer gel into a plurality of fractions according to size or composition due to the difference in the swelling rate.

A polymer gel according to the present invention can be in a shrunken state at its phase transition temperature or above. It is in a swelled state when there is solvent contained therein at its phase transition temperature or below.

More specifically, at the phase transition temperature or above, interactions between the chains of the polymer gel intensify, causing shrinkage of the polymer gel, hence, discharge of the solvent out of the network structure formed by crosslinkage. The present invention utilizes this effect for the purpose of effective separation and/or classification of the polymer gel.

As a consequence, the particles of the polymer gel obtained by the above-described manufacturing methods are uniform in their composition as well as in their size.

The polymer gel formed by the above-described methods has an average particle size ranging from 0.1 $\mu$m to 100 $\mu$m. The standard deviation in the distribution of the particle sizes is within about 20% of the average particle size, preferably, within 10% (which means that, when the average particle size is, for example, 10 $\mu$m, the standard deviation is within 2 $\mu$m, preferably, 1 $\mu$m).

Alternatively, the above-described methods provide a polymer gel whose phase transition peak has a width of 10° C. or less, preferably, 5° C. or less, when it is measured at a heating rate of 1° C./min by differential scanning calorimetry (by DSC 10 manufactured by Seiko Electronic Co., Ltd.).

When such a polymer gel is used to form an actuator, the resultant actuator is sharp in its movement and ensures a high-speed response.

Suitable polymers to which the polymerization method according to the present invention can be applied include polyacrylic acid, polyacrylamide, polyvinyl alcohol, polystyrene, their derivatives and their copolymers. Hence, suitable monomers that can be used to form such polymers include acrylic acid, methacrylic acid, acrylamide, methacrylamide, vinyl acetate, styrene and their derivatives. Preferably employed are (meth)acrylamide and its N-substituted derivative. Known unsaturated carboxylic acids and their derivatives may also be suitably used.

In the present invention, homopolymerization of the monomers produces a water-soluble polymer. In the case where it is impossible to form a gel, a crosslinking agent may be preferably used to connect the monomers which have been polymerized.

Suitable crosslinking agents include compounds whose molecule has a plurality of reactive groups. Such molecular crosslinking agents may be N, N' - methylene-bis acrylamide or divinylbenzene. Ionic crosslinkage which uses metallic ions may also be employed. Molecular crosslinking agents and metallic ions are used in a quantity ranging from 10 mol % to 0.1 mol % of the monomer, preferably, in the vicinity of 1 mol % of the monomer, although the quantity depends on the phase transition temperature of the polymer gel. Crosslinkage using electromagnetic waves such as gamma rays is also possible.

Any dispersion medium of the type which is not soluble with the monomer can be used as a dispersion medium in which a monomer with or without a crosslinking agent is dispersed. In the case of a water-soluble monomer, a non-water, hydrocarbon type solvent, such as n-hexane, may be suitably employed. In the case of a water-insoluble type monomer, water may be used as the dispersion medium. A surface active agent may be added when the monomer is to be dispersed in the dispersion medium. Suitable surface active agents include sorbitan type agents, such as Span type surface active agents (manufactured by Altas Powder Co.) or SP-O type surface active agents (manufactured by Kao). The amount of surface active agent to be added to 100 parts by weight of dispersion medium may be from 1 part by weight to 10 parts by weight.

Known dispersion methods may be employed to disperse the monomer in a dispersion medium, including stirring and ultrasonic processing. If the monomer is in a solid state, it may be made into a liquid or be dissolved in an adequate solvent before dispersion so that the resultant solution will contain particles having a uniform size.

Preferably, the concentration of the monomer dispersed in a dispersion medium should be 70 wt % or less. More preferably, it should be 50 wt % or less.

Known polymerization methods may be employed to polymerize the monomer dispersion thus obtained. Such polymerization methods include radical polymerization, ionic polymerization, electromagnetic wave polymerization which employs ultraviolet radiation, electron beams or X-rays and thermal polymerization. These methods are selected in accordance with the type of monomer to be polymerized.

The temperature at which polymerization takes place differs depending on the type of monomer and the type of polymerization initiator. Electromagnetic waves may be used to initiate polymerization when a polymer having a low phase transition temperature is to be produced.

Typical polymerization initiators that are capable of initiating polymerization at a temperature equal to or lower than the phase transition temperature of a resultant polymer gel include those which initiate ionic polymerization, such as organometal compounds, metal alcoholate, alkalis, nucleophilic reagents, e.g., amine, and bases, and those which initiate redox polymerization, such as amine-ammonium persulfate and cumene hydroperoxide-iron (II). So long as polymerization proceeds at a temperature equal to or lower than the phase transition temperature, any other polymerization initiators may be used.

When polymerization takes place at a temperature equal to or higher than the phase transition temperature of the resultant polymer gel, an adequate polymerization initiator can be selected relatively easily. That is, thermal polymerization initiators such as benzoyl peroxide and azobisisobutyronitrile and photo polymerization initiators may also be used in addition to those described above.

As stated above, phase transition of a polymer gel involves discharge of a solvent which dissolves and/or swells the polymer out of the system of the polymer.

As a consequence, it is desirable for the polymer gel particles to have uniform shape and size. This makes separation (isolation) and classification of the resultant polymer gel into fractions according to size an important operation.

Natural sedimentation or centrifugal separation may be used to separate and/or classify a polymer gel. In the case of separation of the polymer gel by sedimentation, the larger the difference in specific gravity between the solvent and the polymer gel particles, the higher the separation capability (classification capability). Hence, in the first separation/classification method according to the present invention, the temperature of the polymer is kept at a value equal to or higher than the phase transition temperature thereof to make the polymer shrink. In this way, the solvent is expelled from the polymer gel, making a larger difference in the specific gravity between the polymer gel particles and the solvent or dispersion medium and thereby enabling a highly pure polymer gel to be prepared in a state where it is classified into fractions according to size in a short period of time. Polymer gel particles having the same shape can be obtained by repeating the above-described operation a plurality of times.

Also, a polymer gel may be classified into fractions according to its composition utilizing differences in the swelling rate or in the degree of swelling which is caused by differences in composition.

In this invention, the polymer gel is dispersed again in the shrunken state, and this polymer gel is dissolved in or swelled by a low molecular weight compound such as a solvent or a solution so as to allow it to be separated into fractions according to its composition utilizing differences in the time required for the individual polymer gel particles to be dissolved in or swelled by the low molecular weight compound or differences in the swelling rate and the degree of swelling of the individual polymer gel particles.

This second separation/classification method will be described now in detail. Whereas the above-described natural sedimentation or centrifugal separation is a process of separating the polymer gel into two or more fractions according to size or differences in specific gravity, this second method involves separation of the polymer gel into fractions according to composition or other properties.

First, phase transition is generated in the swelled polymer gel to make the polymer gel shrink. Phase transition may be initiated using heat, pH, salt, an electric field or a solvent. However, since the reversibility of the process is taken into consideration, heating is most preferable. So, the following description exemplifies the phase transition by heat.

When the polymer gel is heated to a temperature equal to or higher than the phase transition temperature thereof, phase transition of the polymer gel occurs and the polymer gel goes into a shrunken state in which a low-molecular compound, normally, a solvent, contained in the polymer gel to be discharged from the system. At that time, precipitation may occur, resulting in an increase in the density of the polymer gel. However, in the present invention, since the polymer gel particles are dispersed in the solvent or dispersion medium in the form of fine droplets, the precipitation rate is slow. In a case where the precipitation rate is high, as in the natural sedimentation employed in the above-described first method, an adequate solvent may be added to the dispersion medium to match the specific gravity (density) of the dispersion medium with that of the polymer gel particles and thereby slow down the precipitation rate of the polymer gel particles in order to prepare a substantially stable dispersion.

Next, a low molecular weight compound capable of dissolving and/or swelling the polymer gel is added. The swelled states or the swelled rates of the polymer gel particles differ due to differences in size or in composition. This produces sedimentation rates of the polymer gel particles which are different and enables the classification of the polymer gel into its fractions according to its composition as well as size. Although the type of low molecular weight compound that can be employed differs depending on the type of polymer gel, when, for example, polyacrylamides are used as the polymer gel, a pure solvent, such as water, methyl alcohol or ethylene glycol, or a solution, such as sodium chloride aqueous solution or a mixture solution of acetone and water, may be employed as a low-molecular compound.

Any of these low molecular weight compounds are capable of dissolving or swelling the polymer gel. However, the rate of or limitation in the dissolution or swelling differs depending on the size or the composition of the polymer gel particles. For example, the larger the size of the polymer gel particles, the longer it takes for the low molecular weight compound to permeate. Also, the higher the density at which crosslinkage occurs, the slower the permeation rate and the smaller the degree of swelling. Furthermore, in the case of a copolymer, the degree of swelling or the degree of dissolution also differs depending on the copolymerization ratio.

Although it is ideal that the composition of the polymer gel particles be uniform, variations cannot be avoided in practice because of manufacturing considerations. Hence, in the present invention, classification of the polymer gel is made possible by utilizing differences in the time required for or differences in limitations in the swelling or dissolution of the polymer gel particles.

The above-described first and second separation/classification methods may be performed singularly or in combination. In a case where these two methods are performed in combination, the first method is particularly effective in separating a polymer gel into fractions according to its size, whereas the second method mainly involves separation of the polymer gel into fractions according to its composition, resulting in fractions of the polymer gel particles having more uniform size and composition.

It has been discovered by a dynamic light scattering method and DSC that the polymer gel thus obtained exhibits a sharp phase transition.

The present invention not only provides a polymer gel polymerization and separation and/or classification method but also a polymerizing method which is capable of ensuring that the polymerization itself ensures that a resultant polymer gel has uniform composition and particle size. In this polymerization method, monomers or a monomer solution which is an ingredient of a polymer gel is dispersed in a dispersion medium, and the resultant dispersion is polymerized at a temperature equal to or less than the solidification point of monomers or the monomer solution.

Needless to say, the polymer gel obtained by this polymerization method can be separated and/or classified into fractions by the above-described first or second method.

The thus-obtained polymer gel according to the present invention can be used in an actuator which utilizes swelling and shrinkage caused by a phase transition of the polymer gel. Since the polymer gel according to the present invention has no variations in its phase transition temperature, an actuator which employs the polymer gel according to the present invention ensures a quick response and accurate operation.

Next, an example of the actuator which employs the polymer gel according to the present invention will be described below with reference to FIG. 1.

An actuator shown in FIG. 1 is of the type in which a piston moves in the lateral direction and thereby does work as the volume of the polymer gel employed changes.

The actuator includes a cylinder 1 for a piston, a membrane 2 which passes a solvent or solution but blocks a polymer gel, a piston 3 fixed to the membrane 2, a polymer gel 4 including solvent or solution therein according to the present invention, a solvent or solution 5 that is capable of dissolving or swelling the polymer gel 4, and electrodes 6-1 and 6-2 which are a positive pole and a negative pole, respectively. A switch 8 can be closed to complete the circuit having power source 7 so as to heat the cylinder using electrodes 6-1 and 6-2, the heat causing the swollen polymer gel 4 to shrink when the temperature reaches the phase transition temperature. As the polymer gel shrinks, the membrane 2 and piston 3 move to the left because the shrunken particles are smaller than when they are in a swollen state. Also, solvent in the polymer gel 4 passes through membrane 2 and into the area of the actuator containing solvent 5. When switch 8 is opened, the cylinder is not heated and the gel cools. When the cooling gel reaches the phase transition temperature, the polymer gel swells and membrane 2 and piston 3 are moved to the right. The swelling process also includes the polymer gel particles 4 absorbing the solvent present in the gel as well as solvent 5 of the actuator that has passed through membrane solvent 2 and into polymer gel 4.

Next, the present invention will be explained concretely using the following Examples and Comparison Examples.

EXAMPLE 1

5 ml of surface-active agent SP-010 (manufactured by Kao) was added to 100 ml of liquid paraffin which acted as a dispersion medium. The mixture was then ice-cooled for an hour while being aerated with nitrogen gas.

0.5 g of N-isopropyl acrylamide, 13.3 mg of N, N'-methylene-bis acrylamide, 7.5 mg of sodium acrylate, and 6 $\mu$l of N, N, N', N' - tetramethylethylenediamine were dissolved in 9 ml of pure water, and the solution was then ice-cooled to obtain a solution A.

In order to conduct redox polymerization, an aqueous solution (solution B) was prepared by dissolving 1 mg of ammonium persulfate in 1 ml of pure water, and this solution B was then mixed with the solution A. The resultant mixture solution was poured into the dispersion medium which was being stirred in a flask by a stirrer rotated at a speed of 800 rpm and allowed to be polymerized for an hour. During the polymerization, the temperature of the dispersion was maintained at 20°±1° C.

Thereafter, the reaction solution was heated to 40°±1° C. 100 ml of n - hexane was added to this reaction solution, and the resultant solution was then stirred sufficiently. The precipitate generated within 24 hours was collected. After the remaining n - hexane had been removed from the precipitate by means of an evaporator, 300 ml of pure water was added to the precipitate. The solution was then stirred for 24 hours to swell the gel.

The particulate gel thus obtained was then filtered under pressure by means of a filtering device manufactured by Millipore which employs a filter paper having a pore size of 10 $\mu$m to remove the gel particles and dust having a diameter of 10 $\mu$m or greater.

The size of the particulate gel was measured by the dynamic light scattering method and found that the average size was 0.45 $\mu$m at 25° C. (the standard deviation was 0.1 $\mu$m). When this particulate gel was allowed to stand for 2 days in that state, there occurred substantially no change in the volume of the particulate polymer gel and the average size remained the same. Thus, this state of the polymer gel was regarded as a swelled state.

This swelled polymer gel was moved from an environment of 25° C. to that of 40° C., and found that the time required for the volume of the polymer gel to reduce from 100% swelled state to 50% swelled state was about 1 minute. The average size of the gel particles at 40° C. was 0.20 μm.

The gel which was precipitated within 5 minutes at 40° C. was collected, and the gel collected was swelled again by pure water at 25° C. The resultant gel exhibited standard deviation of 0.05 μm. This proves that the repetitive operation was effective in improving the uniformity of the particle size.

It was also found out by DSC that the phase transition temperature of the gel was 33° C. This means that the polymerization temperature, 20° C., was lower than the phase transition temperature and that the temperature 40° C. at which the isolation of the gel was performed was higher than the phase transition temperature.

COMPARISON EXAMPLE 1

Polymerization was performed in the same manner as that of Example 1 with the exception that the polymerization temperature was kept at 40°±1° C. Although the resultant polymer gel particles had an average particle size of 2 μm, they exhibited a standard deviation of 1 μm.

The gel thus obtained showed no change in its volume due to a change in the temperature. It was therefore found that this gel was inadequate for use in an actuator.

COMPARISON EXAMPLE 2

Polymerization was performed at 20°±1° C. in the same manner as that of Example 1. The resultant polymer gel was then allowed to stand for 24 hours, as in Example 1. However, the amount of precipitate was small, because the gel was dispersed evenly. We measured the phase transition peak of the resultant gel by DSC and found that it was too broad with its peak being in the vicinity of 35° C.

EXAMPLE 2

Polymerization was performed in the same manner as that of Example 1 with the exception that no surface-active agent was added. The resultant gel particles had a diameter of about 1 mm. The gel particles were large in size and were therefore separated from the dispersion medium by natural sedimentation. We measured the width of the phase transition peak of the gel particles collected by DSC and found that it was broad.

These gel particles were then caused to shrink in water at a temperature of 40° C. We measured again the width of the phase transition peak of the resultant gel particles by DSC and found that it was sharp. The phase transition temperature of the gel particles was 33° C.

EXAMPLE 3

15 ml of surface-active agent Span 40 (manufactured by Atlas Powder Co.) was added to 100 ml of hexane which acted as a dispersion medium, and the resultant mixture was cooled with ice containing salt while being aerated with nitrogen gas. 0.5 g of N - acrylpiperidine, 13.3 mg of N, N' -methylene-bis acrylamide, and 6 μl of N, N, N', N' - tetramethylethylenediamine were dissolved in 9 ml of pure water, and the solution was then ice-cooled to obtain a solution A1. An aqueous solution (solution B1) was prepared by dissolving 1 mg of ammonium persulfate in 1 ml of pure water, and this solution B1 was then mixed with the solution A1. The mixture solution was poured into the dispersion medium. The resultant dispersion was stirred for 1 hour by an ultrasonic homogenizer manufactured by Bronson. During the polymerization, the reaction solution was kept at 3° C. or below. When the reaction solution was returned to room temperature after the polymerization, the polymer gel settled. The polymer gel settled was collected, and the collected polymer gel was washed with 100 ml of n - hexane. The polymer gel was washed again, and the polymer deposited was again collected.

The phase transition temperature of the resultant polymer particles was 5° C. The polymer particle had an average particle size of 0.2 μm at its phase transition temperature or below, and exhibited standard deviation of 0.05 μm.

EXAMPLE 4

0.5 g of N - isopropyl methacrylamide, 13.3 mg of N, N' - methylene-bis acrylamide, and 6 μl of N, N, N', N' -tetramethylethylenediamine were dissolved in 100 ml of pure water, and the resultant solution was then sufficiently aerated with nitrogen gas. Thereafter, two sheets of platinum plate (having dimensions of 1 cm (width)×5 cm (length) and 0.5 mm (thickness)) were immersed into the solution in parallel, and 1 volt (vs SCE) was applied to the platinum plates for 40 minutes to polymerize the solution utilizing an electric field.

During the polymerization, the temperature of the reactive solution was kept at 30° C. or below. After the polymerization, the temperature of the reactive solution was raised to 60° C., and the polymer gel precipitated was then collected. We conducted measurement on the resultant polymer gel by DSC and found that the phase transition temperature was 43° C.

The thus-obtained polymer gel in the shrunken state was dispersed in a solvent of hexane by means of an ultrasonic homogenizer, and 10 ml of pure water was then added to the resultant dispersion. Polymer gel particles having a small diameter provided a composition which allowed for easy swelling and the particles settled in a short period of time. The polymer gel which settled within 1 hour was collected. We measured the width of the peak of the phase transition of the resultant polymer gel by DSC and found that it was 8° C.

EXAMPLE 5

5 ml of surface-active agent SP-010 (manufactured by Kao) was added to 100 ml of n - hexane which acted as a dispersion medium. The mixture was then ice-cooled for an hour while being aerated with nitrogen gas.

0.5 g of N-isopropyl acrylamide, 13.3 mg of N, N'-methylene-bis acrylamide, and 6 μl of N, N, N', N' -tetramethylethylenediamine were dissolved in 9 ml of pure water, and the resultant solution was then ice-cooled to obtain a solution A2.

An aqueous solution (solution B2) was prepared by dissolving 1 mg of ammonium persulfate in 1 ml of pure water, and this solution B2 was then mixed with the solution A2. The mixture solution was poured into the dispersion medium which was being stirred in a flask by a stirrer rotated at a speed of 800 rpm and allowed to be polymerized for an hour. During the polymerization, the temperature of the dispersion was kept at 20°±1° C.

Thereafter, the reaction solution was heated to 40°±1° C. to cause the polymer gel to shrink. The thus-obtained polymer gel in a shrunken state was placed in a centrifuge tube made of polypropylene, and centrifugal separation was then conducted on it at 3,000 rpm. This resulted in deposition of white precipitate on the bottom and side wall of the centrifuge tube. The supernatant liquid was removed by decantation.

Subsequently, in order to wash away the surface-active agent remaining on the surfaces of the polymer gel particles, 100 ml of n - hexane was added to the precipitate and the resultant solution was then thoroughly stirred. The solution which had been stirred was centrifuged for 40 minutes at 3,000 rpm and 40°±1° C. to collect the polymer gel. This operation was repeated two times to obtain a polymer gel A. Thereafter, 300 ml of n - hexane was added to the polymer gel, and the polymer gel 1 was then dispersed in n - hexane by means of an ultrasonic homogenizer. 100 ml of pure water which acted as a low molecular weight compound was added to the solution, and the dispersion was then stirred for 1 hour to cause it to swell. The thus-obtained dispersion was packed in a column, allowed to stay, and thereby classified into fractions according to the differences in sedimentation time.

We measured the particle size of the fraction of the particulate polymer gel which had settled in the first hour by dynamic light scattering method, and found that the average size was 0.45 $\mu$m (standard deviation was 0.05 $\mu$m).

The polymer gel thus obtained was incorporated into an actuator shown in FIG. 1. We moved the resultant actuator from an environment of 25° C. to that of 40° C., and measured the time required for the actuator to shrink from 100% swelled state to 50% swelled state. It was about 30 seconds. A substantially similar change could be seen when the actuator was caused to shrink by means of the electrodes 6-1 and 6-2 shown in FIG. 1.

Measurement by DSC was conducted at a heating rate of 1° C./min, and found that the phase transition temperature was 33° C. and that the half value width was 3° C. This means that the phase transition was sharper than that of the polymer gel A, which exhibited the half value width of 5° C. The fraction of the polymer gel obtained in the subsequent hour had an average particle size of 0.3 $\mu$m.

EXAMPLE 6

15 ml of surface-active agent Span 40 (manufactured by Atlas Powder Co.) was added to 100 ml of liquid paraffin which acted as a dispersion medium, and the resultant mixture was cooled with ice containing salt while being aerated with nitrogen gas.

0.5 g of N - acrylpiperidine, 13.3 mg of N, N' -methylene-bis acrylamide, and 6 $\mu$l of N, N, N', N' -tetramethylethylenediamine were dissolved in 9 ml of pure water, and the resultant solution was then ice-cooled to obtain a solution A3.

An aqueous solution (solution B3) was prepared by dissolving 1 mg of ammonium persulfate in 1 ml of pure water, and this solution B3 was then mixed with the solution A3. The mixture solution was poured into the dispersion medium. The resultant dispersion was stirred for 1 hour by an ultrasonic homogenizer manufactured by Bronson. During the polymerization, the reaction solution was maintained at 3° C. or below. When the reaction solution was returned to room temperature after the polymerization, the polymer gel settled. The polymer gel that had settled was collected, and the collected polymer gel was washed with 100 ml of ether. The polymer gel was washed again, and the polymer deposited was collected again.

The obtained polymer was dispersed in 100 ml of hexane at 10° C., and 100 ml of pure water was then added to the dispersion to cause it to swell. Classification was conducted on the resultant polymer gel particles to obtain polymer gel particles having a phase transition temperature at 5° C. and an average particle size of 0.2 $\mu$m at its phase transition temperature or below with a standard deviation of 0.05 $\mu$m.

EXAMPLE 7

7.5 mg of acrylic acid was added to the solution A2 formed in Example 2 for copolymerization. The resultant copolymer was classified in the same manner as that employed in Example 5. It was found out that the fraction obtained in the first hour contained sodium acrylate in an amount ranging from 0 mg to 1 mg per 0.1 g of N - isopropylacrylamide, that the fraction obtained in the subsequent hour contained sodium acrylate in an amount ranging from 1 mg to 2.0 mg, and that the remaining contained 2.0 mg or more of sodium acrylate.

Although it was known from the result of bulk polymerization that the degree of swelling of the polymer gel particles differs according to the amount of sodium acrylate contained therein, it was previously impossible to conduct classification on the particulate polymer gel. However, using the method of the present invention, the polymer gel was classified into fractions according to its composition, i.e., utilizing the differences in the degree of swelling of the polymer gel particles.

EXAMPLE 8

5ml of surface-active agent SP-010 (manufactured by Kao) was added to 100 ml of n - hexane which acted as a dispersion medium. The mixture was aerated with nitrogen gas while it was kept at 20°±1° C.

0.5 g of N-isopropyl acrylamide, 13.3 mg of N, N' -methylene-bis acrylamide, 7.5 mg of sodium acrylate and 6 $\mu$l of N, N, N', N' - tetramethylethylenediamine were dissolved in 9 ml of pure water, and the resultant solution was then ice-cooled to obtain a solution 4.

An aqueous solution (solution B4) was prepared by dissolving 1 mg of ammonium persulfate in 1 ml of pure water, and this solution B4 was then mixed with the solution A4. The resultant mixture solution was poured into the dispersion medium which was being stirred in a flask by a stirrer rotated at a speed of 800 rpm and was thereby allowed to be dispersed therein. The reaction flask was then quickly placed in a freezing medium of dry ice-actetone so that it was kept at −5°±1° C. during the polymerization which lasted 1 hour.

In the above-describe operation, the solidifying point of the aqueous solution which contained N-isopropyl acrylamide, N, N' -methylene-bis acrylamide as well as other constituents was about −1° C. This aqueous solution was dispersed in n - hexane at 20° C., which was higher than the solidifying point of the aqueous solution, and polymerization was performed at −5° C., which was lower than the solidifying point. Thus, this example satisfied the requirement of the present invention. The dispersion medium, n - hexane, remained nonsolidified and was adequately viscous with the solidified monomer aqueous solution being dispersed therein uniformly at −5° C.

The polymer thus obtained was separated from the dispersion medium, the surface-active agent, non-reacted monomer and other constituents, and was classified into fractions according to it size and composition in the manner described below.

The reaction solution was placed in a centrifuge tube made of polypropylene and the centrifuge tube was heated to 40°±1° C. The solution was then centrifuged for 30 minutes at 3,000 rpm. This resulted in the deposition of white precipitate on the bottom and side wall of the centrifuge tube. The supernatant liquid was removed by decantation.

Subsequently, in order to remove the residual surface-active agent, 100 ml of n - hexane was added to the precipitate. After the solution was stirred to a sufficient extent, it was heated to 40°±1° C. and was then centrifuged for 40 minutes at 3,000 rpm. A cyclic operation, consisting of collection of the precipitant, washing of the collected precipitant with n - hexane, and centrifuging of the solution, was repeated twice.

After n - hexane had been removed by an evaporator, 300 ml of pure water was added to the gel and the solution was then stirred for 24 hours to cause the gel to swell. In this state, the gel still contained impurities, such as residual monomer and non-linked polymer solution.

For the purpose of removing these impurities, the gel which was placed in a centrifuge tube made of polycarbonate was heated to 40°±1° C. and was centrifuged for 40 minutes at 10,000 rpm to cause the gel to precipitate.

The centrifugal separator employed at this time was RS-20IV Model 9N manufactured by Tomy Seiko in which a centrifugal rotor had a radius of 96 mm. About 12,000 G was applied to the gel at 10,00 rpm. If a centrifugal force larger than this value is applied to the gel, the gel would be crushed and gelatinized. If the centrifugal force applied to the gel is smaller than the above-described value, no particulate gel will precipitate (due to substantially no difference in the density).

Thereafter, the thus-obtained particulate gel was filtered under pressure by a filtering device manufactured by Millipore which employed a filter paper having a pore size of 10 $\mu$m to remove the dust and the gel particles having a diameter of 10 $\mu$m or greater.

We measured the particle diameter of the resultant gel by dynamic light-scattering method, and found that the average diameter thereof was 0.45$\mu$m (with a standard deviation of 0.1 $\mu$m). We formed the actuator shown in FIG. 1 using this gel. It took about 1 minutes for this actuator to shrink from 100% swelled state to 50% swelled state when it was moved from an environment of 25° C. to that of 50° C.

EXAMPLE 9

15 ml of surface-active agent Span 40 (manufactured by Atlas Powder Co.) was added to 100 ml of hexane which acted as a dispersion medium, and the resultant mixture was cooled with ice containing salt while being aerated with nitrogen gas.

0.5 g of N - acrylpiperidine, 13.3mg of N, N' -methylene-bis acrylamide, and 6$\mu$l of N, N, N', N' -tetramethylethylenediamine were dissolved in 9 ml of pure water, and the resultant solution was then ice-cooled to obtain a solution A5.

An aqueous solution (solution B5) was prepared by dissolving 1 mg of ammonium persulfate in 1 ml of pure water, and this solution B5 was then mixed with the solution A5. The mixture solution was poured into the dispersion medium. The resultant dispersion was stirred at 5° C. for 1 minute by an ultrasonic homogenizer manufactured by Bronson, and the resultant reaction solution was then cooled to −5° C. or below for polymerization. When the reaction solution was returned to room temperature after the polymerization, the polymer gel settled. The polymer gel settled was collected, and the collected polymer gel was washed with 100 ml of n - hexane. The polymer gel was washed again, and the polymer gel particles deposited were again collected.

The phase transition temperature of the obtained polymer gel was 5° C. The polymer gel had an average particle size of 0.2 $\mu$m at its phase transition temperature or below with standard deviation of 0.05 $\mu$m.

EXAMPLE 10

5 g of acrylamide (having a melting point of 84.5° C.) was dissolved in 100 ml of n-heptane at 90° C. The resultant solution was stirred for 5 minutes by an ultrasonic homogenizer. The dispersion was cooled to 25° C. at a cooling rate of 5° C./min. to solidify it in that state. Gamma rays were radiated upon the resultant dispersion to polymerize it. The resultant polymer was collected by centrifugation. 100 ml of pure water was added to the polymer gel collected to cause it to swell. This resulted in the production of a polymer gel having a uniform diameter of 0.5 $\mu$m.

EXAMPLE 11

5 g of N - methylolacrylamide (having a melting point of 65° C.), together with 0.1 g of benzoyl peroxide, was dispersed in xylene at 70° C. utilizing ultrasonic waves. Immediately after the dispersion, the resultant dispersion was cooled to 60° C. to solidify N - methylolacrylamide particles. The resultant dispersion was left in that state for 1 hour at 60° C. to complete polymerization. The polymer particles were collected, and 100 ml of pure water was added to the polymer particles collected to cause it to swell.

As will be understood from the foregoing description, in the present invention, it is possible to classify the polymer gel into fractions utilizing the differences in swelled states caused by its composition, as well as the differences in its size. This allows for the manufacture of a polymer gel with a sharp phase transition. When such a polymer gel is formed into an actuator, the resultant actuator responds with quick and accurate movement.

What is claimed is:

1. A method of manufacturing a polymer gel comprising the steps of:
    preparing a polymer gel by polymerizing monomers from which a polymer gel can be formed at temperature equal to or less than a phase transition temperature of the resultant polymer gel; and
    separating the resultant polymer gel into fractional portions thereof at a temperature equal to or greater than the phase transition temperature of said polymer gel.

2. The method according to claim 1, wherein said monomers are (meth)acrylic acid, (meth)acrylamide, or N-substituted (meth)acrylamides.

3. The method according to claim 1, wherein said monomers include an unsaturated carboxylic acid.

4. The method according to claim 1, wherein said polymer gel is prepared by copolymerizing monomers consisting of (meth)acrylic acid, (meth)acrylamide or N-substituted (meth)acrylamides and monomers consisting of unsaturated carboxylic acid.

5. The method according to claim 1, wherein said separating step is carried out according to polymer gel particle size.

6. The method according to claim 1, wherein said separating step is carried out according to polymer gel particle composition.

7. The method according to claim 1, wherein said separating step is carried out such that where the average polymer gel particle diameter of at least one of the fractional portions ranges from 0.1 µm to 100 µm, the standard deviation in the distribution of particle diameters in said at least one fractional portion is at most 25% of the average particle diameter in that fractional portion.

8. The method according to claim 1, wherein the width of the phase transition temperature of at least one of said fractional portions measured by DSC at a heating rate of 1° C./min is within 10° C.

9. A method of manufacturing a polymer gel comprising the steps of:
preparing the polymer gel by polymerizing monomers from which said polymer gel is formed; and
separating the resultant polymer gel by adding a low molecular weight compound that can swell the polymer gel and separating the polymer gel into fractional portions thereof based on a difference in swelling rate or degree of swelling.

10. The method according to claim 9, wherein said monomers from which the polymer gel is formed are polymerized at a temperature equal to or greater than a phase transition temperature of said polymer gel.

11. The method according to claim 9, wherein said monomers are (meth)acrylic acid, (meth)acrylamides or N-substituted (meth)acrylamides.

12. The method according to claim 10, wherein said monomers are (meth)acrylic acid, (meth)acrylamides or N-substituted (meth)acrylamides.

13. The method according to claim 9, wherein said monomers include an unsaturated carboxylic acid.

14. The method according to claim 10, wherein said monomers include an unsaturated carboxylic acid.

15. The method according to claim 9, wherein said polymer gel is prepared by copolymerizing monomers consisting of (meth)acrylic acid, (meth)acrylamides or N-substituted (meth)acrylamides and monomers consisting of unsaturated carboxylic acid.

16. The method according to claim 10, wherein said polymer gel is prepared by copolymerizing monomers consisting of (meth)acrylic acid, (meth)acrylamides or N-substituted (meth)acrylamides and monomers consisting of unsaturated carboxylic acid.

17. The method according to claim 9, wherein said separating step is carried out according to polymer gel particle size.

18. The method according to claim 9, wherein said separating step is carried out according to polymer gel particle composition.

19. The method according to claim 9, wherein said separating step is carried out such that where the average polymer gel particle diameter of at least one of the fractional portions ranges from 0.1 µm to 100 µm, the standard deviation in the distribution of particle diameters in said at least one fractional portion is at most 25% of the average particle diameter in that fractional portion.

20. The method according to claim 9, wherein the width of a phase transition temperature of at least one of said fractional portions measured by DSC at a heating rate of 1° C./min is within 10° C.

21. The method according to claim 10, wherein said separating step is carried out according to polymer gel particle size.

22. The method according to claim 10, wherein said separating step is carried out according to polymer gel particle composition.

23. The method according to claim 10, wherein said separating step is carried out such that where the average polymer gel particle diameter of at least one of the fractional portions ranges from 0.1 µm to 100 µm, the standard deviation in the distribution of particle diameters in said at least one fractional portion is at most 25% of the average particle diameter in that fractional portion.

24. The method according to claim 10, wherein the width of the phase transition temperature of at least one of said fractional portions measured by DSC at a heating rate of 1° C./min is within 10° C.

25. A method of manufacturing a polymer gel comprising the steps of:
preparing the polymer gel by polymerizing monomers from which the polymer gel is formed at a temperature equal to or less than a phase transition temperature of the resultant polymer gel;
separating the resultant polymer gel into first fractional portions thereof at a temperature equal to or greater than the phase transition temperature; and
further separating at least one of said first fractional portions of the polymer gel by adding a low molecular weight compound that can swell said at least one first fractional portion and separating said at least one first fractional portions into second fractional portions thereof based on a difference in swelling rate or degree of swelling.

26. The method according to claim 25, wherein said monomers are (meth)acrylic acid, (meth)acrylamides or N-substituted (meth)acrylamides.

27. The method according to claim 25, wherein said monomers include an unsaturated carboxylic acid.

28. The method according to claim 25, wherein said polymer gel is prepared by copolymerizing monomers consisting of (meth)acrylic acid, (meth)acrylamides or N-substituted (meth)acrylamides and monomers consisting of unsaturated carboxylic acid.

29. The method according to claim 25, wherein said separating step is carried out according to polymer gel particle size.

30. The method according to claim 29, wherein said further separating step is carried out according to polymer gel particle size.

31. The method according to claim 29, wherein said further separating step is carried out according to polymer gel particle composition.

32. The method according to claim 25, wherein said separating step is carried out according to polymer gel particle composition.

33. The method according to claim 32, wherein said further separating step is carried out according to polymer gel particle size.

34. The method according to claim 32, wherein said further separating step is carried out according to polymer gel particle composition.

35. The method according to claim 25, wherein said separating step and said further separating step are carried out such that where the average polymer gel particle diameter of at least one of the second fractional portions ranges from 0.1 μm to 100 μm, the standard deviation in the distribution of particle diameters in said at least one second fractional portion is at most 25% of the average particle diameter in that second fractional portion.

36. The method according to claim 25, wherein the width of the phase transition temperature of at least one of said second fractional portions measured by DSC at a heating rate of 1° C./min is within 10° C.

37. A method of manufacturing a polymer gel comprising:
preparing a dispersion by dispersing a monomer solution from which the polymer gel can be formed in a dispersion medium; and
polymerizing the resultant dispersion at a temperature equal to or less than the solidifying point of the monomer solution.

38. A method of manufacturing a polymer gel comprising:
preparing a dispersion by dispersing monomers or a monomer solution from which the polymer gel can be formed in a dispersion medium;
polymerizing the resultant dispersion at a temperature equal to or less than the solidifying point of the monomers or the monomer solution; and
separating the resultant polymer gel into fractional portions thereof at a temperature equal to or greater than the solidifying point of the monomers or of the monomer solution.

39. The method according to claims 37 or 38, wherein said monomers are (meth)acrylic acid, (meth)acrylamides or N-substituted (meth)acrylamides.

40. The method according to claims 37 or 38, wherein said monomers include an unsaturated carboxylic acid.

41. The method according to claims 37 or 38, wherein said polymer gel is prepared by copolymerizing monomers consisting of (meth)acrylic acid, (meth)acrylamides or N-substituted (meth)acrylamides and monomers consisting of unsaturated carboxylic acid.

42. The method according to claims 37 or 38, wherein said polymerizing step is carried out such that where the average polymer gel particle diameter of said polymer gel ranges from 0.1 μm to 100 μm, the standard deviation in the distribution of particle diameters in said polymer gel is at most 25% of the average particle diameter in the polymer gel.

43. The method according to claims 37 or 38, wherein the width of the phase transition temperature of the polymer gel measured by DSC at a heating rate of 1° C./min is within 10° C.

* * * * *

UNITED STATES PATENT AND TRADEMARK OFFICE
CERTIFICATE OF CORRECTION

PATENT NO.  : 5,183,879
DATED       : February 2, 1993
INVENTOR(S) : SATOSHI YUASA It is certified that error appears in the above-identified patent and that said Letters Patent is hereby corrected as shown below:

COLUMN 12

Line 48, "B4was" should read --B4 was--.
    Line 56, "above-describe" should read --above-described--.
    Line 64, "satisfied" should read --satisfies--.

COLUMN 13

Line 35, "10,00 rpm." should read --10,000 rpm.--.
    Line 50, "1 minutes" should read --1 minute--.

COLUMN 14

Line 54, "tem-" should read --a tem- --.

Signed and Sealed this

First Day of February, 1994

Attest:

BRUCE LEHMAN

Attesting Officer        Commissioner of Patents and Trademarks